United States Patent [19]

Moberg

[11] Patent Number: 4,950,154
[45] Date of Patent: Aug. 21, 1990

[54] COMBINATION INJECTION MOLD AND SPRUE BUSHING

[76] Inventor: Clifford A. Moberg, W328 N4065 Allendale Dr., Nashotah, Wis. 53058

[21] Appl. No.: 374,927

[22] Filed: Jul. 3, 1989

[51] Int. Cl.$^5$ .............................................. B29C 45/73
[52] U.S. Cl. ................................... 425/552; 219/421; 425/567; 425/589
[58] Field of Search .............. 425/547, 552, 567, 569, 425/589, 190, 192 R; 219/421

[56] References Cited

U.S. PATENT DOCUMENTS

| | | | |
|---|---|---|---|
| 2,828,509 | 4/1958 | Smucker et al. | 425/552 |
| 3,635,702 | 1/1972 | Badia et al. | 420/488 |
| 3,676,310 | 7/1972 | Wishnie | 420/485 |
| 3,817,487 | 6/1974 | Riedel | 249/135 |
| 3,988,176 | 10/1976 | Watanabe et al. | 249/135 |
| 4,191,601 | 3/1980 | Edens et al. | 148/160 |
| 4,260,435 | 4/1981 | Edens et al. | 148/414 |
| 4,403,405 | 9/1983 | Gellert | 219/421 |
| 4,594,221 | 6/1986 | Caron et al. | 420/488 |

FOREIGN PATENT DOCUMENTS

| | | | |
|---|---|---|---|
| 1107943 | 5/1961 | Fed. Rep. of Germany | 420/488 |
| 59-145745 | 8/1984 | Japan | 420/488 |
| 614141 | 11/1979 | Switzerland | 249/135 |
| 616053 | 7/1978 | U.S.S.R. | 249/135 |
| 789653 | 1/1958 | United Kingdom | 420/288 |
| 1358055 | 6/1974 | United Kingdom | 420/488 |

OTHER PUBLICATIONS

Nichols, Malcolm A., "Use of Beryllium Copper in Plastic Molds", India Rubber World, N.Y., N.Y. (Apr. 1952), pp. 80–81.

Primary Examiner—Jay H. Woo
Assistant Examiner—Timothy W. Heitbrink
Attorney, Agent, or Firm—Willis B. Swartwout, III

[57] ABSTRACT

A quick set sprue bushing for use in combination with injection molding apparatus. The bushing is made from a beryllium-free alloy that will rapidly dissipate heat. The alloy is of the copper, nickel type and reduces the cure time by between 15% and 20%. The significance of being beryllium-free is that it has been established that beryllium is a carcinogen and endangers workers. A bushing of this type results in the sprue or tail of the molten plastic type cooling as rapidly as possible for removal of the molded product from the mold. The bushing is elongated and has a generally conical passageway along its longitudinal centerline axis that diverges in the direction of the flow of material therethrough, and is further provided with a stainless steel bushing insert at the end that receives the injection mold apparatus nozzle such that the bushing will not conduct heat from the injection apparatus to the mold but will dissipate heat from the mold that comes from the molten material.

3 Claims, 2 Drawing Sheets

COMBINATION INJECTION MOLD AND SPRUE BUSHING

BACKGROUND OF THE INVENTION

The field of this invention is injection molding, particularly plastic injection molding. In plastic injection molding a key problem is involved with the cost of the molds. The fewer molds that are required to sustain the necessary level of production the more cheaply the product may be produced and sold. There is a direct relationship, therefore, between the length of mold cooling time and the number of molds needed. One of the means of accomplishing rapid mold cooling is described in my co-pending application Ser. No. 07/193,728 wherein I describe the arcuate and spherical disbursement of core pins made from a copper alloy and used, whether or not there is a need for an indentation or aperture in the mold, to dissipate heat from the mold more rapidly thereby diminishing time consumed in using any one mold.

Where the injection nozzle is inserted into the mold a sprue bushing is adapted for the mold to receive the nozzle snugly leaving as little a "tail" or sprue as it is called in the industry as is possible. This bushing, of course, heats up as a result of the molten plastic flowing through it into the mold, and as a result of receiving the hot nozzle. When the flow of molten material through the nozzle is discontinued the bushing and "tail" or sprue must also cool before the mold may be said to be cured or cooled to the point of being able to discharge its product without damage.

Finally, the sprue or tail of the product being molded must be smallest in cross-sectional dimension at the orifice of the injection mold nozzle and largest at the end of the elongated bushing remote from the nozzle to facilitate ready discharge of the cooled molded product from the mold. In other words the cross-sectional dimension and shape of the sprue is of significant concern to the speed of the process.

SUMMARY OF THE INVENTION

The present invention is a beryllium free copper alloy sprue bushing mounted in an injection mold structure and having a stainless steel insert adapted to receive and cool molten material.

The present invention proposes to provide in a device of the character above described, a sprue bushing adapted to receive the nozzle of an injection molding apparatus in a nozzle orifice to bushing passageway alignment.

The present invention further proposes to provide in a device of the character above described, a nozzle orifice to bushing passageway alignment in which the injection molding apparatus nozzle will remain in aligned position to resupply the mold structure with molten material after cooling and emptying of the mold is accomplished.

The present invention yet further proposes to provide in a device of the character above described, a beryllium free copper alloy bushing to dissipate heat rapidly cooperating with other heat dissipating structures such as heat dissipating core pins to most expeditiously cool the mold to accomplish emptying and reuse of the mold.

The present invention still further proposes to provide in a device of the character above described, a bushing having a longitudinally disposed conical passageway being in a reverse direction to material flow to provide a reverse minimal "tail" or sprue of material remaining within the bushing to cool with the molded product. This "tail" or sprue is later cut off or otherwise removed and is usually considered scrap or "regrind" material.

The present invention proposes to still further provide in a device of the character above described, a beryllium-free copper sprue bushing in place of a copper beryllium alloy bushing such as was used in the past to harden the copper alloy as beryillium has been found to be a carcinogen which could endanger the health of persons working in the molding process and this part of the ingredients of the alloy has been changed for that reason. The copper still gives the required heat transfer, or in this case dissipating, qualities required to reduce cooling time anywhere from 10% to 50% depending on the relationship of the sprue to be cooled and the total mold to be cooled in terms of volume of hot material and heat dissipating core pin availability and placement.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
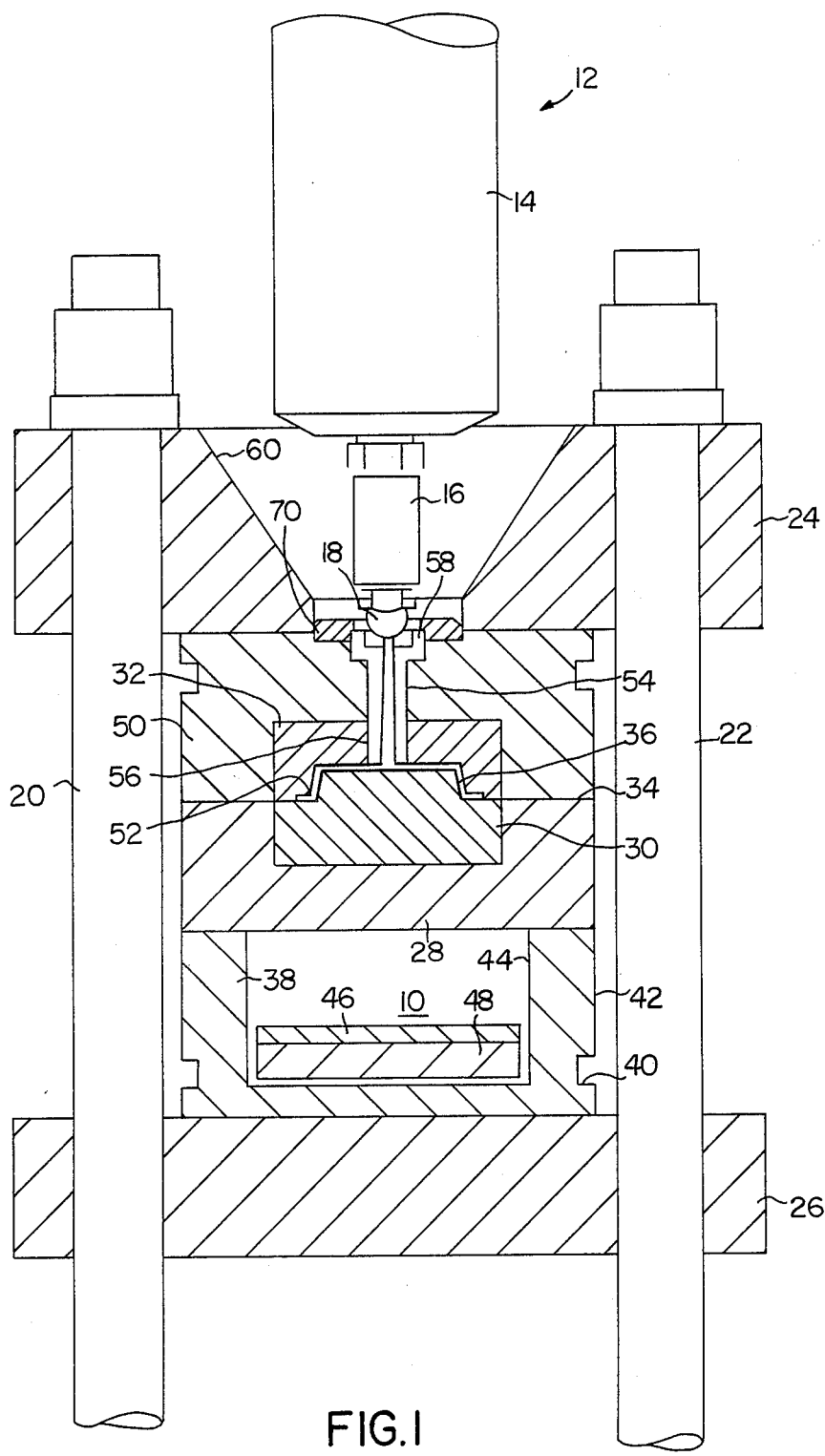
FIG. 1 is a view partially in vertical plan and partially in vertical cross-section showing the preferred embodiment of the present invention as it appears with other structure to which it relates and with which it combines to accomplish the invention.

Referring now to the drawings and more particularly to FIG. 1 thereof, an injection mold structure is shown and generally identified by the numeral 10. Mold structure 10 is shown in conjunction with a vertical plan showing of a portion of an injection molding apparatus generally identified by the numeral 12.

Molding apparatus 12 includes a mold barrel 14, a nozzle extension 16 and a nozzle tip 18 all for use with mold structure 10 in a fashion that will later be described.

Molding apparatus 12 further includes a pair of mold tie bars 20 and 22. Tie bars 20 and 22 are fixedly mounted on a stationary platen 24 adjacent to one end of the respective tie bars 20 and 22. A moveable platen 26 is slideably mounted on tie bars 20 and 22 to move axially relative to tie bars 20 and 22 toward and away from stationary platen 24.

Intermediate stationary platen 24 and moveable platen 26 there is disposed mold structure 10 including a mold base 28 containing a mold core 30. A cavity mold 32 is disposed to abut and receive base upper surface 34 and projection 36.

Axially between mold base 28 and moveable platen 26 there is disposed an ejector box 38. Ejector box 38 has an annular groove 40 in the radially outwardly facing circumferential surface 42 disposed axially adjacent to moveable platen 26.

Ejector box 38 is provided with a centrally disposed generally cylindrical aperture 44 containing a retainer plate 46 and a backup plate 48 joined together in any suitable manner for longitudinal axial movement within aperture 44. Ejector box 38 is detachably connected to mold base 28 so that when desired mold core 30, mold base 28, ejector box 38 and moveable platen 26 can all be moved as a unit axially along the longitudinal centerline axis of tie bars 20 and 22 respectively. Thus when the molten material which has been introduced into the mold has cooled sufficiently the mold may be opened to extract the molded product.

Cavity mold 32 is contained within a cavity plate 50 and cavity plate 50 is in turn connected to stationary platen 24. Cavity mold 32 is provided with a cavity axial surface 52 adjacent to projection 36 which is spaced from ejector box 38 and configured relative thereto to shape the product to be molded to the desired shape. Note that cavity plate 50 and cavity mold 32 are respectively provided with longitudinal, generally cylindrical in cross-sectional dimension, apertures 54 and 56 which register to receive a sprue bushing 58 extending from cavity axial surface 52 to the surface of stationary platen 24 abutting cavity plate 50.

Also, it should be noted that stationary platen 24 is provided with a centrally disposed generally truncated conically shaped aperture 60 for purposes which will be more fully described later herein.

Sprue bushing 58 is made from a beryllium free copper alloy which enables it to act as a very fast heat exchange or dissipating conduit.

Figure 2:
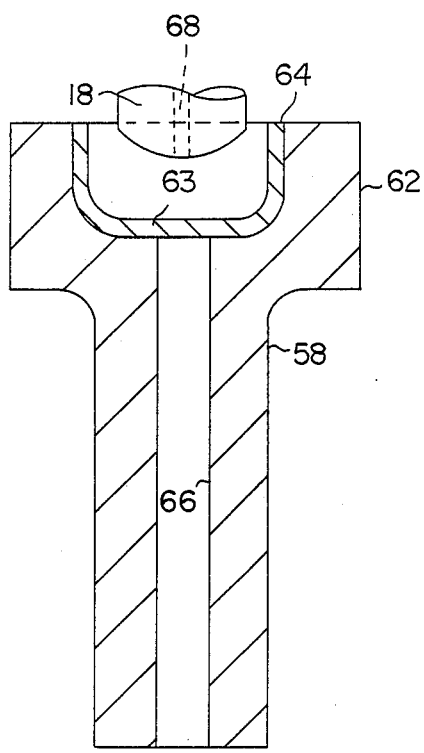
FIG. 2 is a vertical cross-sectional view of the preferred embodiment of the sprue bushing forming a part of the present invention.

Referring now in particular to FIG. 2 of the drawings note that sprue bushing 58 is generally cylindrical in cross-sectional dimension with a T-end 62 at one end of the bushing provided with a nozzle receiving stainless steel insert 63 in aperture 64 at one end. A generally truncated conical passageway 66 is longitudinally axially disposed in bushing 58 to extend from aperture 60 divergingly to cavity axial surface 52.

Nozzle tip 18 is provided with a molten material passageway 68 which is in alignment and registration with sprue conical passageway 66.

An insert ring 70 is provided to surround the T-end 62 of bushing 58 to assist the mold operator in properly aligning the mold 10 and the molding apparatus 12 by surrounding T-end 62 at plate 24 and cavity plate 50 aligning bushing 58 with the passageway 68 in nozzle tip 18.

By referring to FIG. 1 of the drawings, it can be seen that the diverging conical cross-sectional shape of passageway 66 in bushing 58 facilitates the withdrawal of the molded product sprue or "tail" from the mold after the material solidifies sufficiently in the cooling process. It can also be easily seen that by using the beryllium free copper alloy bushing the carcinogenic problem is eliminated and the cooling time is substantially diminished for the mold, while at the same time stainless steel insert 63 prevents heat from mold barrel 14, nozzle extension 16, and nozzle tip 18 from being transmitted to the mold structure 10. Mold cooling will be even more rapid if the mold is also provided with appropriate heat dissipating core pins as disclosed in my co-pending application previously referred to herein.

What I claim is:

1. Injection molding apparatus comprising in combination:
    (a) an elongated injection mold barrel having a nozzle extension and a nozzle tip respectively successively axially mounted on said barrel;
    (b) a mold structure including a stationary platen fixedly coupled at right angles to one end each of a pair of spaced parallel elongated tie bars and a moveable platen slideably coupled to said tie bars for axial reciprocal movement thereon toward and away from said stationary platen;
    (c) a centrally disposed injector aperture in said stationary platen disposed to receive in insertive relationship said elongated injection mold barrel and to be in generally axial alignment therewith;
    (d) said mold structure further including a mold base having a centrally disposed mold core and a cavity plate having a centrally disposed cavity mold, said mold base disposed on a side of said moveable platen facing toward the stationary platen and said cavity plate disposed on a side of said stationary platen facing toward said moveable platen, a surface of said mold core facing the stationary platen and a surface of the cavity mold facing the moveable platen combining to complementarily define a cavity having a configuration of a product to be molded when said moveable platen is moved axially on said tie bars to cause said mold base to be in abutting relationship to said cavity plate;
    (e) a passageway through said stationary platen, cavity plate and cavity mold in coaxial alignment with said elongated injection mold barrel, nozzle extension, and nozzle tip;
    (f) a beryllium-free copper alloy sprue bushing configured to fit within said passageway from said stationary platen to said cavity, said sprue bushing having a passageway coaxial with and along a longitudinal centerline axis of the sprue, stationary platen, cavity plate and cavity mold;
    (g) a stainless steel insert located intermediate the nozzle tip and said sprue bushing to prohibit heat exchange from said nozzle tip to the cavity mold and configured to enhance heat dispersion from the cavity mold to atmosphere via said sprue bushing whereby molten material from the mold barrel is passed through the sprue bushing into said cavity to form a product, whereby said sprue bushing dissipates heat from the cavity mold to atmosphere.

2. The structure as set forth in claim 1, wherein the mold base, mold core, cavity mold and cavity plate are removably disposed along a longitudinal centerline axis of said molding apparatus intermediate the stationary and moveable platens.

3. The structure as set forth in claim 1, wherein the mold base and mold core are separable from the cavity plate and cavity mold upon axial movement in one axial direction of said moveable platen along said tie bars.

* * * * *